United States Patent [19]
Thomas et al.

[11] Patent Number: 5,666,645
[45] Date of Patent: Sep. 9, 1997

[54] DATA MANAGEMENT AND DISTRIBUTION SYSTEM AND METHOD FOR AN ELECTRONIC TELEVISION PROGRAM GUIDE

[75] Inventors: William Thomas, Highlands Ranch; David W. Gustafson, Golden; Dennis Tenney, Louisville; Paul Darata, Littleton, all of Colo.

[73] Assignee: News America Publications, Inc., New York, N.Y.

[21] Appl. No.: 430,327

[22] Filed: Apr. 26, 1995

[51] Int. Cl.[6] .............................. H04H 1/02; H04N 7/10; H04N 5/38; H01J 13/00
[52] U.S. Cl. ........................... 455/6.1; 343/6; 343/723; 343/906; 395/200.47
[58] Field of Search ........................... 348/6, 7, 12, 13, 348/723, 906; 455/3.1, 4.1, 4.2, 5.1, 6.1, 6.2, 6.3; 395/200.09; H04N 7/10, 7/14, 5/38

[56] References Cited

U.S. PATENT DOCUMENTS

| | | | |
|---|---|---|---|
| 5,559,548 | 9/1996 | Davis et al. | 348/6 |
| 5,576,755 | 11/1996 | Davis et al. | 348/13 |
| 5,579,055 | 11/1996 | Hamilton et al. | 348/906 X |
| 5,585,866 | 12/1996 | Miller et al. | 348/10 |

FOREIGN PATENT DOCUMENTS

| | | | |
|---|---|---|---|
| WO9419881 | 1/1994 | WIPO . | |
| WO9414284 | 6/1994 | WIPO . | |
| WO9429811 | 11/1994 | WIPO . | |
| WO9531069 | 11/1995 | WIPO | H04N 7/087 |

Primary Examiner—Glenton B. Burgess
Assistant Examiner—John W. Miller
Attorney, Agent, or Firm—Weil, Gotshal & Manges LLP

[57] ABSTRACT

A data management and distribution system for an electronic program guide ("EPG") for television programs comprising an automated data collection subsystem, a manual entry and correction subsystem, a database validation subsystem, an edition generation subsystem, a configuration subsystem, and a status and control subsystem. The system may further comprise a feed generation subsystem if one or more of the EPG providers supported by the EPG distributor requires a live feed of data. The automated data collection subsystem collects EPG data from multiple sources in various formats, filters the data based on the needs of the EPG providers supported, and places the data in a centralized database in a form suitable to support the different environmental contexts of the EPG providers. The manual entry and correction subsystem permits the EPG distributor to make manual corrections, additions, and deletions to the data stored in the database. The database validation subsystem verifies the data stored in the database in accordance with designated verification options. The edition generation subsystem generates the different editions of the EPG for the different EPG providers supported by the EPG distributor. The configuration subsystem receives information from the various EPG providers and furnishes this information to the other subsystems which utilize the information in performing their respective tasks. The status and control subsystem monitors the operation of the data management and distribution system as a whole. The various feeds and editions are then transmitted to the EPG providers by, e.g., satellite, wire, cable, etc. The EPG providers receive the feeds and editions and use them provide one or both of a dedicated channel EPG and interactive EPG to subscribers.

37 Claims, 8 Drawing Sheets

DATA MANAGEMENT AND DISTRIBUTION SYSTEM AND METHOD FOR AN ELECTRONIC TELEVISION PROGRAM GUIDE

BACKGROUND OF THE INVENTION

This invention relates to an electronic program guide ("EPG") system for television that provides users with schedule information for broadcast or cablecast programs available for viewing on a television receiver. More particularly, it relates to a system and method for the management and distribution of the data, i.e., program schedules and associated information, used to provide EPGs to users.

Electronic program guides for television systems are known in the art, particularly with regard to cable television systems. For example, one common implementation of an electronic program guide utilizes a dedicated cable television channel for continuously broadcasting program schedule information. The advantage of such a system is that it is relatively easy to deploy because it is centrally implemented at the cable headend. No additional electronics or software are required at the cable system subscriber location because full control of the display is maintained at the cable headend. The television viewer simply tunes the cable converter box or television tuner to the channel on which the schedule information is modulated and views the program listings. Typically, these program guides utilize a scrolling display of television listings. Some systems employ a partial screen of listings with additional information in the remainder of the screen, such as advertisements for movies on pay channels or pay-per-view (PPV) events as well as other commercial information. These systems generally incorporate a grid or matrix to display the program schedule information, with a different row for each channel and columns representing different time slots.

In addition, interactive program guides are known in the art. Interactive guides are more versatile than dedicated channel guides because they operate under user control. However, they are more costly to implement because they require memory and processor capabilities at each user site. The hardware and software for interactive EPGs may be resident in the cable converter box, television receiver, VCR or other equipment located at the viewer location.

Program guides of both the non-interactive, dedicated channel type and interactive type are distributed to many different providers of television programs and EPGs, including multi-system operators ("MSOs"), cable television system headends, direct satellite television broadcast systems, and over-the-air pay television systems (collectively, the "EPG providers"). In addition, it is likely that in the near future there will be additional providers of television programming, such as local telephone companies. It is therefore anticipated that the number of EPG providers will increase significantly over the next several years as more and more cable systems, direct broadcast satellite systems, and other providers of television programming take steps to enhance the services provided to subscribers. In addition, television program providers will be offering larger numbers of channels in the near future, possibly as many as 500. Moreover, existing EPGs are becoming more sophisticated in the quantity and quality of information on television programs available in the EPG. The above factors will result in a substantial increase in the volume of data handled by the distributor of an EPG ("EPG distributor") to a plurality of EPG providers. There is thus a need for an EPG data management system to provide for the automated collection and processing of EPG data in an efficient and cost effective manner with a minimum of human operator intervention. In addition, the system must be capable of receiving data from multiple sources, each in different, often incompatible formats. The greater the amount of data distributed to different EPG providers, the greater the amount of data that must be received and processed.

A data management system for an EPG must also manage and coordinate the receipt of data from multiple sources. Because this data is provided by outside service providers, often the data format is incompatible with the format utilized by the EPG distributor. Therefore, an EPG data management system must have a means for collecting data from these various sources and performing the necessary processing functions on the data so it is compatible with the database format utilized by the EPG distributor.

One factor complicating the distribution of EPG data to EPG providers is that, in the television program distribution industry, the hardware and software used for transmission of program and other information and for reception processing varies from one distributor to the next. In order to realize broad distribution of EPGs, an EPG distributor's system must be capable of interfacing with each of the various hardware and software systems used by the EPG providers.

The distribution of an EPG to a particular EPG provider is influenced not only by specific hardware and software transmission protocol, but also by other factors, such as the EPG provider's geographic location, the electronic storage and processing capabilities of its data processing systems, and the nature and extent of programming offered by the EPG provider. For example, if an EPG distributor created a standard global database of television program schedule information that contained listings for substantially all of the stations offered in a plurality of markets (or all markets) across the country, the standard database would have to be customized for a particular EPG provider by filtering out information related to stations outside of a particular EPG provider's geographical market and other stations not carried on the EPG provider's system before the EPG product could be used. In addition, the EPG data must be tailored to the particular EPG provider's time zone. Thus, an EPG distributor must be able to furnish a series of customized, filtered versions of its standard database product corresponding to each of the geographical markets where the product is used.

The filtration process also depends upon the processing and storage capabilities of the local program distributor's computers. For example, the EPG distributor could perform the filtration process using its central computers and then deliver a customized product to each EPG provider. In another scenario, the standard global database (or a subset thereof comprising data for a plurality of EPG providers) could be transmitted to each EPG provider where the provider's computers could perform the filtration process. Alternatively, the EPG distributor could install its own remote computer systems at each of the EPG provider sites, in which case the standard global database would be transmitted to each remote computer, which would then perform the filtration process before passing the customized database to the EPG provider's computers via a local transmission link.

Current data processing systems for cable television system headends and other EPG providers vary widely in the manner in which they receive and process data. Whereas some systems may be configured to receive an entire file, such as the "IPG" computer from General Instruments, others may require that the data be broken up into transactions used to update a database resident on the data processor, such as the Information Services Processor (ISP) from Scientific-Atlanta. Another scenario under development for the distribution of an EPG is the utilization of a continuous or "live" digital data stream. The data stream is transmitted to the EPG provider, which in turn distributes it to the various system subscribers. Each subscriber is provided with appropriate software and data processing capabilities to extract only the schedule information for programs carried by the local program and EPG provider. One example of such a system is the DigiCable feed generator designed for TCI. The DigiCable system continuously generates a digital stream of EPG data and transmits it to DigiCable compatible EPG providers. The data format and transmission protocol for this type of system are very different from those of a system such as the ISP and IPG that transmit data to program distributors on a periodic basis. Therefore, the EPG distributor's system must be capable of generating different data feeds for each of the different types of systems used by different EPG providers.

In addition to providing the EPG database to the EPG providers, the EPG distribution system must also download the software needed to access and utilize the EPG data to the EPG providers. For interactive EPGs, the software is then provided to the subscribers of the EPG provider for storage in their settop boxes or in a data processor provided in a television receiver, VCR, personal computer, or other equipment provided at the user site. Just as the data processing systems at each of the EPG providers differ, so do the settop boxes provided to the subscribers, which must be compatible with the data processing system at the EPG provider. The different EPG providers may thus require the software to be configured differently in order to be properly downloaded to subscribers.

In order to accommodate a plurality of EPG providers with varying processing, storage, and information content requirements, an intelligent EPG data distribution system is needed to transmit the proper data using the proper format and transmission protocol for each EPG provider.

It is therefore an object of the present invention to provide an EPG data management and distribution system that collects data from multiple sources, processes the data to create a global database of television program schedule information, and distributes customized EPGs to a plurality of EPG providers.

It is a further object of this invention to provide a plurality of configurations for creating customized EPG's using information from a standard global database of program schedule information.

It is a further object of this invention to provide a data distribution and management system for an EPG comprising an automated data collection system for collecting data from multiple information providers.

SUMMARY OF THE INVENTION

These as well as other objectives are met by the EPG data management and distribution system of the present invention. The system comprises several subsystems including an automated data collection subsystem, a manual entry and correction subsystem, a database validation subsystem, an edition generation subsystem, a configuration subsystem, and a status and control subsystem. The system may further comprise a feed generation subsystem if one or more of the EPG providers supported by the EPG distributor requires a "live" or continuous feed of data.

The automated data collection subsystem collects EPG data from multiple sources in various formats, filters the data based on the needs of the EPG providers supported, and places the data in a centralized main database in a form suitable to support the different environmental contexts of the EPG providers. The manual entry and correction subsystem permits the EPG distributor to make manual corrections, additions, and deletions to the data stored in the database. The database validation subsystem verifies the data stored in the database in accordance with designated verification options. The edition generation subsystem generates the different editions of the EPG for the different EPG providers supported by the EPG distributor. The configuration subsystem receives information from the various EPG providers and furnishes this information to the other subsystems, which utilize the information in performing their respective tasks. The status and control subsystem monitors and controls the operation of the data management and distribution system as a whole.

The EPG data management and distribution system of the present invention permits an EPG distributor to provide the data in the appropriate format to a large number of EPG providers in an efficient and cost-effective manner with a minimum of human operator intervention.

The devices or systems to which the EPG is distributed are referred to herein as "target devices," "target platforms," or "target environments." The target devices receive and store the EPG data furnished by the EPG distributor. In the case of a dedicated channel type EPG, the target device is a computer system at the headend of a cable system that creates the individual editions of the guide as required and transmits the guide on a cable channel to subscribers to the cable system. For interactive guides, the target device is a specific type of data processor, located in the settop box or elsewhere at the subscriber location, running a specific application. The subscriber located data processors store the EPG data and use it to produce the EPG under subscriber control.

The EPG data management and distribution system of the present invention is designed to be compatible with the interactive and dedicated channel type EPGs described in the prior, commonly assigned patent applications titled "Electronic Television Program Guide Schedule System and Method," filed Sep. 9, 1993 (Ser. No. 119,367), "Improved Electronic Television Program Guide Schedule System and Method," filed May 20, 1994 (Ser. No. 247,101), "System and Method for Displaying Program Schedule Information on a Television Channel," filed May 20, 1994 (Ser. No. 247,059), "Electronic Television Program Guide Channel System and Method," filed Sep. 23, 1994 (Ser. No. 311,475, now U.S. Pat. No. 5,550,548), and "Electronic Television Program Guide Schedule System and Method with Display and Search of Program Listings By Title," filed Nov. 29, 1994 (Ser. No. 330,684, now U.S. Pat. No. 5,576,755). It will be apparent to those of ordinary skill in the art that the system of the present invention may advantageously be utilized with other EPGs as well.

DETAILED DESCRIPTION OF THE PREFERRED EMBODIMENT

System Configuration

Figure 1:
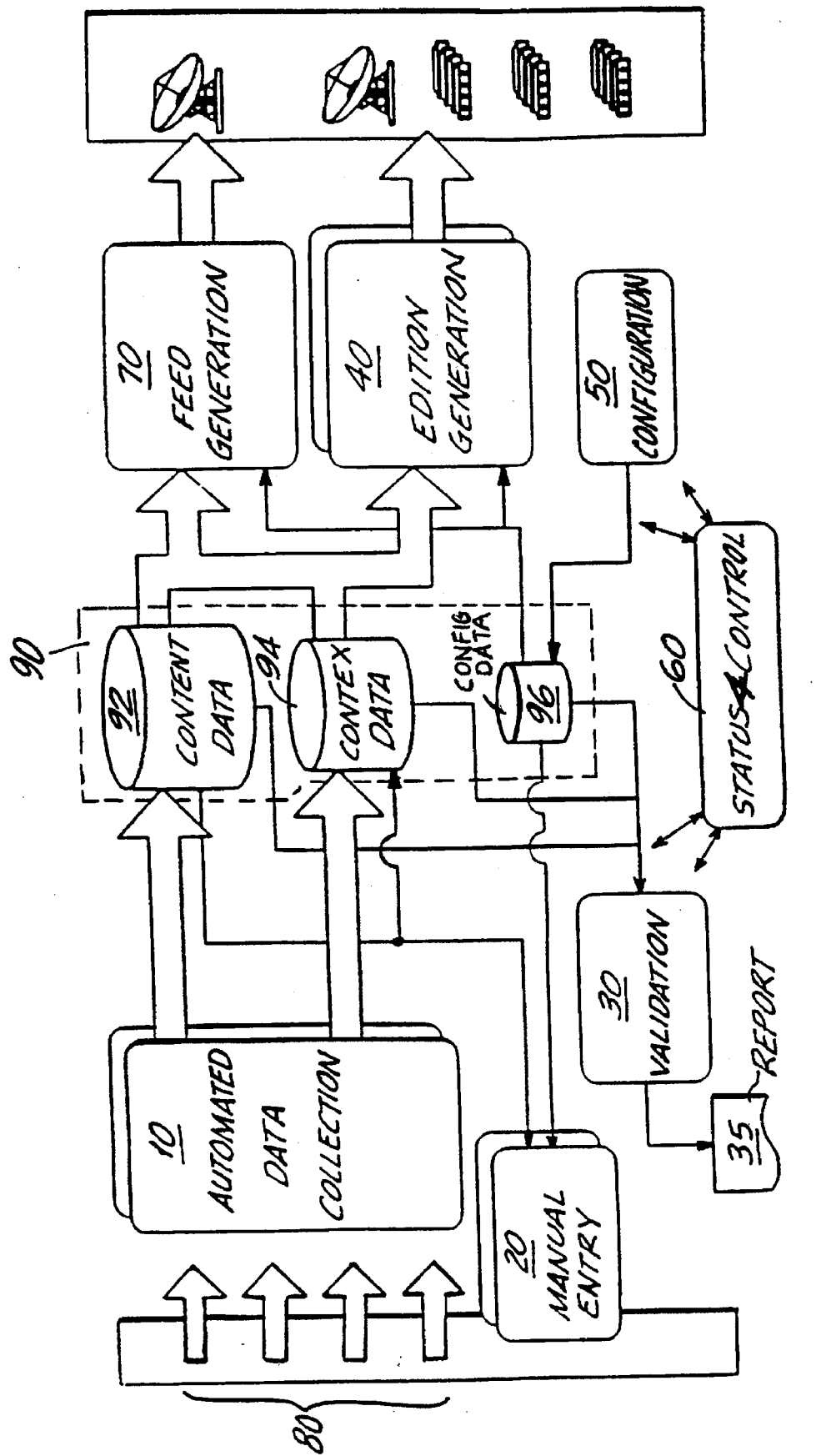
FIG. 1 is a block diagram showing one embodiment of an EPG data management and distribution system of the present invention.

FIG. 1 is a high level block diagram of one embodiment of the EPG management and distribution system 1 of the present invention illustrating the process flow among the various subsystems including the automated data collection subsystem 10, the manual entry and correction subsystem 20, the database validation subsystem 30, an edition generation subsystem 40, the configuration subsystem 50, the status and control subsystem 60, and the feed generation subsystem 70. Also shown in FIG. 1 is the EPG main database 90, which includes content data 92, context data 94, and configuration data 96. Content data refers to information inherent to the programs themselves, such as program titles and descriptions. Context data is program independent and may differ for the same program provided by different EPG providers, such as two different cable headends. The context data determines when a program will be aired and on which channel for a particular EPG provider. Context data also includes channel maps, PPV pricing and schedule information. The configuration data contains the data used by the various subsystem processes for their operation. Examples of this type of data include a list of EPG providers receiving passive editions of the EPG or the several interactive editions of the EPG, and schedules for creation and transport of the different editions. The configuration data also includes data specifying the display capabilities of the target devices supported by the EPG distributor. The arrows in FIG. 1 indicate the flow of information between the various subsystems. The thick arrows designate the flow of program schedule information that comprises the editions and feeds generated by the data distribution system. The thin arrows designate the flow of other information such as manually entered data, control, and configuration data. Status and control subsystem 60 is illustrated as interacting with all of the other subsystems as this subsystem is used for overall system control and status monitoring.

Automated data collection ("ADC") subsystem 10 receives data feed 80 from program schedule information providers in any format utilized by the information provider and filters the data according to the various target devices utilized by the EPG providers and supported by the EPG distributor. The ADC subsystem 10 contains separate processes for each of the data formats of the various information providers. These processes operate independently to insert data into the global or main EPG database 90.

Figure 2:
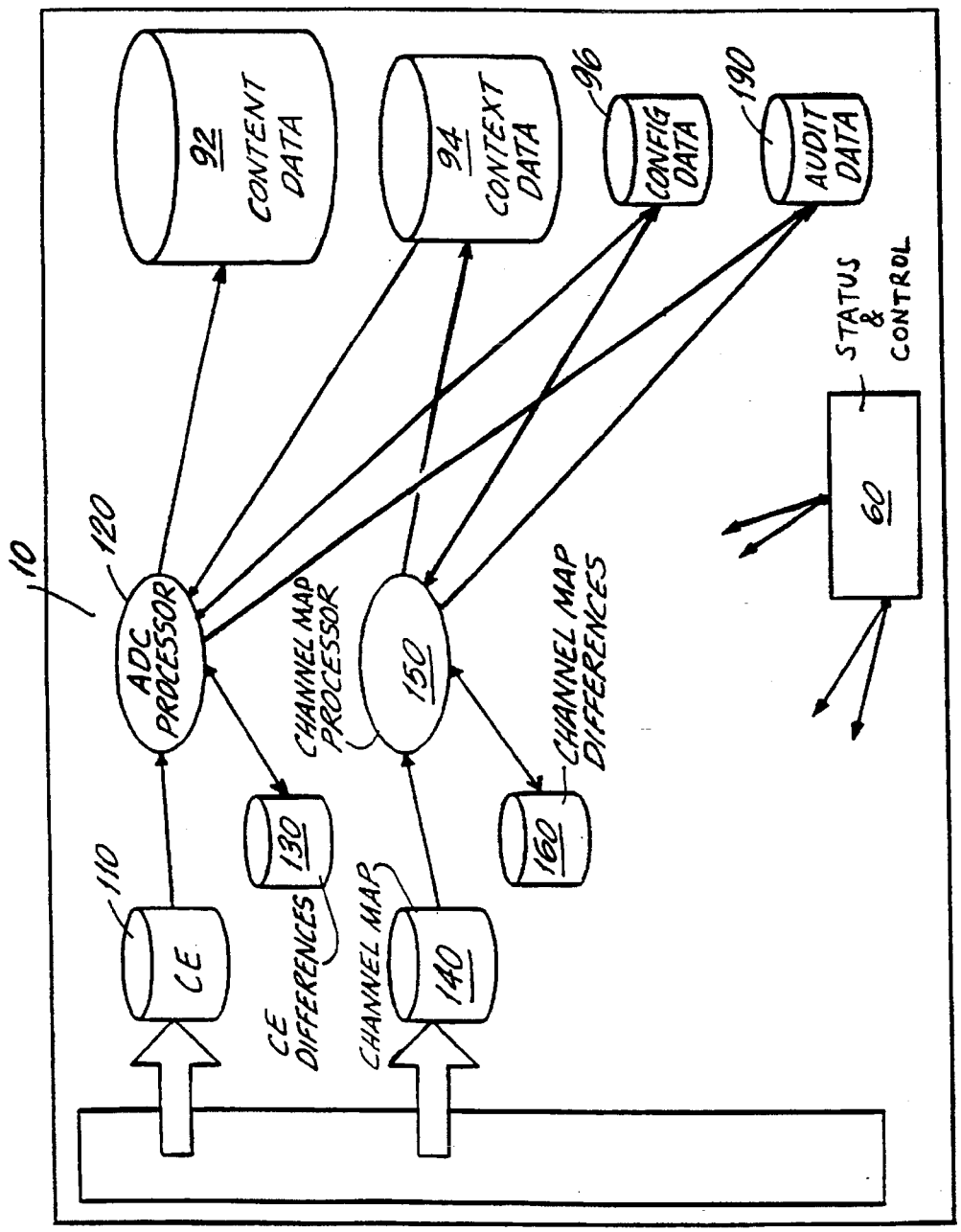
FIG. 2 is a block diagram showing one embodiment of an Automated Data Collection subsystem of the present invention.

FIG. 2 illustrates the operation of one embodiment of the ADC subsystem 10. EPG data is received on a periodic basis, e.g., daily, at 110. The EPG data may contain program schedule information for hundreds or thousands of television stations throughout the country, including networks, local affiliates, cable channels, premium services, and pay-per-view (PPV) programs. The EPG data received at 110 is used to update the data already in the main EPG database. In a preferred embodiment, the received data is referred to as the common data extract (CDE) or common extract (CE) and represents a portion of the data contained in the Digital Publishing System (DPS) utilized for the TV Guide™ printed television program guide published by News America Publishing, Inc. In a preferred embodiment, an application programming interface (API), as described in "Common Extract API Reference Manual," Version 1.0, Jun. 17, 1994, ©1994 News America Publications, Inc., is used for processing the CE.

Only new information is written to the main database 90. The received data may be a complete set of data substantially duplicative of the data already in the main database, or it may be the data for the next incremental time period, such as one day. In order to determine the new information, the received CE 110 is processed by the ADC processor 120 to determine the additions, deletions, and changes made to the data in the main EPG database 90. A database or data store 130 of EPG differences is used to update the main database 90. To determine the differences, the ADC processor reads context data 94 and configuration data 96 to create the differences data store 130 which is a subset of the received data. The data differences data store 130 is in a format optimized for performing the differencing process. It allows the determination of what data is new or different relative to the last time data was collected and processed. This minimizes the number of transactions on the main database. When the data that has been determined to be different is placed in the main database 90, further checks are made to determine if the new data or changes made to the existing data conflict with edits made by the manual edit and corrections subsystem. Updates to the main database 90 may be stored in a file and applied as a batch or made in real time during the differencing process. The differences data store 130 is used to determine the differences in data received from a single source when the received data does not designate the differences from the last received data. The received data is compared with data that was previously received from the same source. The ADC subsystem may also be required to perform a differencing operation when data is received from multiple sources. In this situation, the received data is compared with the data in the main database 90 to determine if it overlaps or is inconsistent with data already stored therein.

The ADC subsystem performs similar steps with regard to received channel map data 140. Channel maps contain listings of the different television stations carried by the EPG providers serviced by the EPG distributor, as well as the particular channel on which each station is carried. Channel maps are required in order to create customized editions of the EPG for each of the EPG providers serviced by the EPG distributor. Channel map data 140 is processed by channel map processor 150 to generate a database of channel map differences database or data store 160. The channel map processor 150 reads configuration data 96 to create the channel map differences 160 which are used to update the main database 90 in a manner similar to that of the differences data store 130. A channel map API used for processing the received channel map data is described in "Channel Mapping API Reference Manual," Version 1.1, Apr. 28, 1994, ©1994 News America Publications, Inc.

If information from additional information providers is utilized by the EPG distributor, the ADC subsystem can include similar procession for filtering and re-formatting the received data as appropriate for placement in the main database 90.

All of the ADC subsystem processes write audit information to a log or audit database 190. The level of audit information is set by retrieving setup information from the common status and control subsystem 60.

Figure 3:
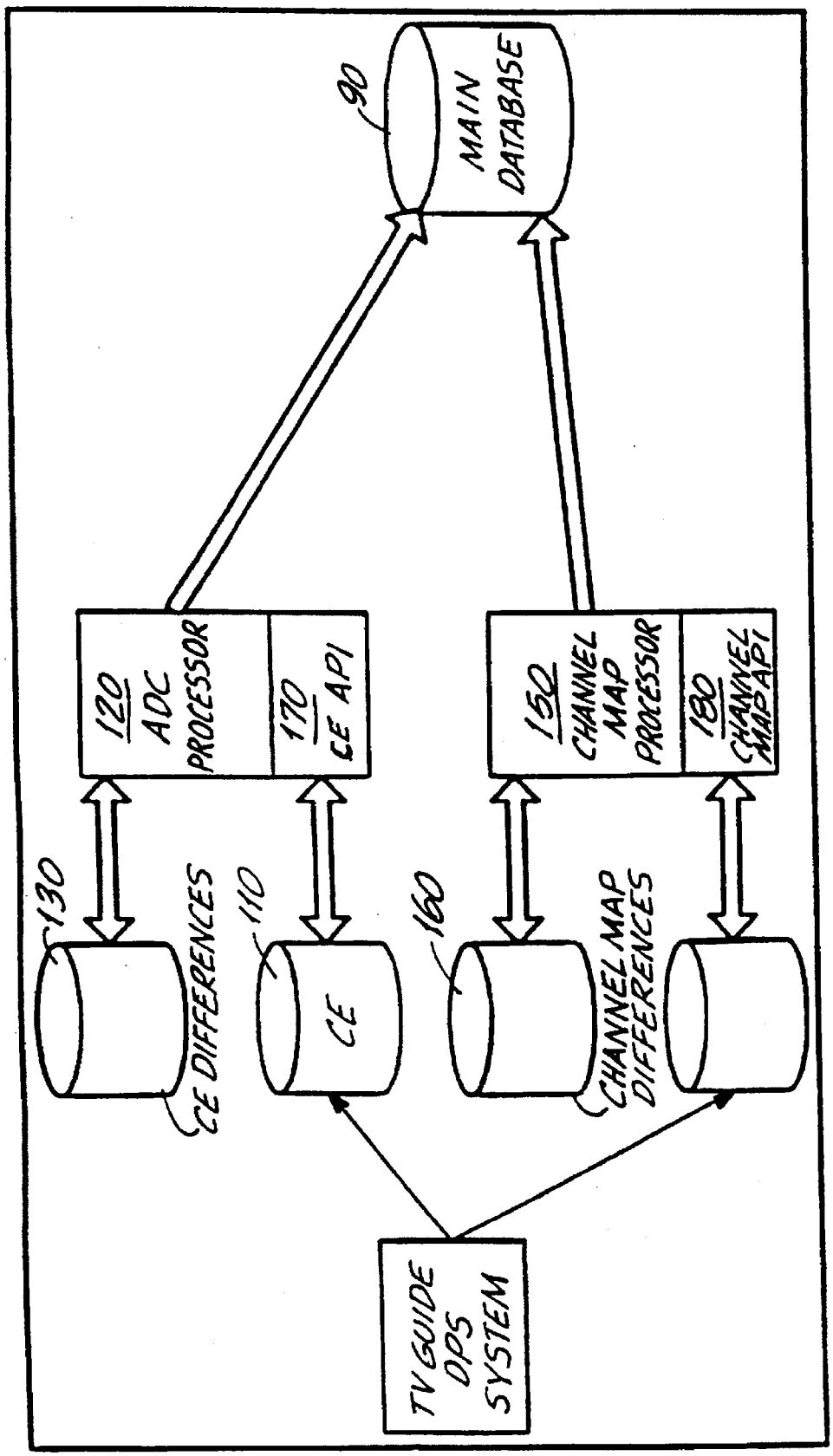
FIG. 3 is a block diagram illustrating the operation of the Automated Data Collection subsystem of FIG. 2.

FIG. 3 illustrates the operation of the ADC processor in greater detail. The ADC processor 120 accesses the CDE 110 through CDE API 170. Differences between the CDE and the data already in the main database 90 are determined and written to the data differences database 130. The ADC processor then updates the main database 90 by writing the differences in the differences database 130 to the main database 90. Similarly, the channel map processor 150 accesses an extract of channel maps 140 through channel map API 180. Differences between the channel map extract and the channel map data already in the main database 90 are determined and written to the channel map differences database 160. The channel map processor 150 then updates the main database 90 by writing the differences in the channel map differences database 160 to the main database 90.

Figure 4:
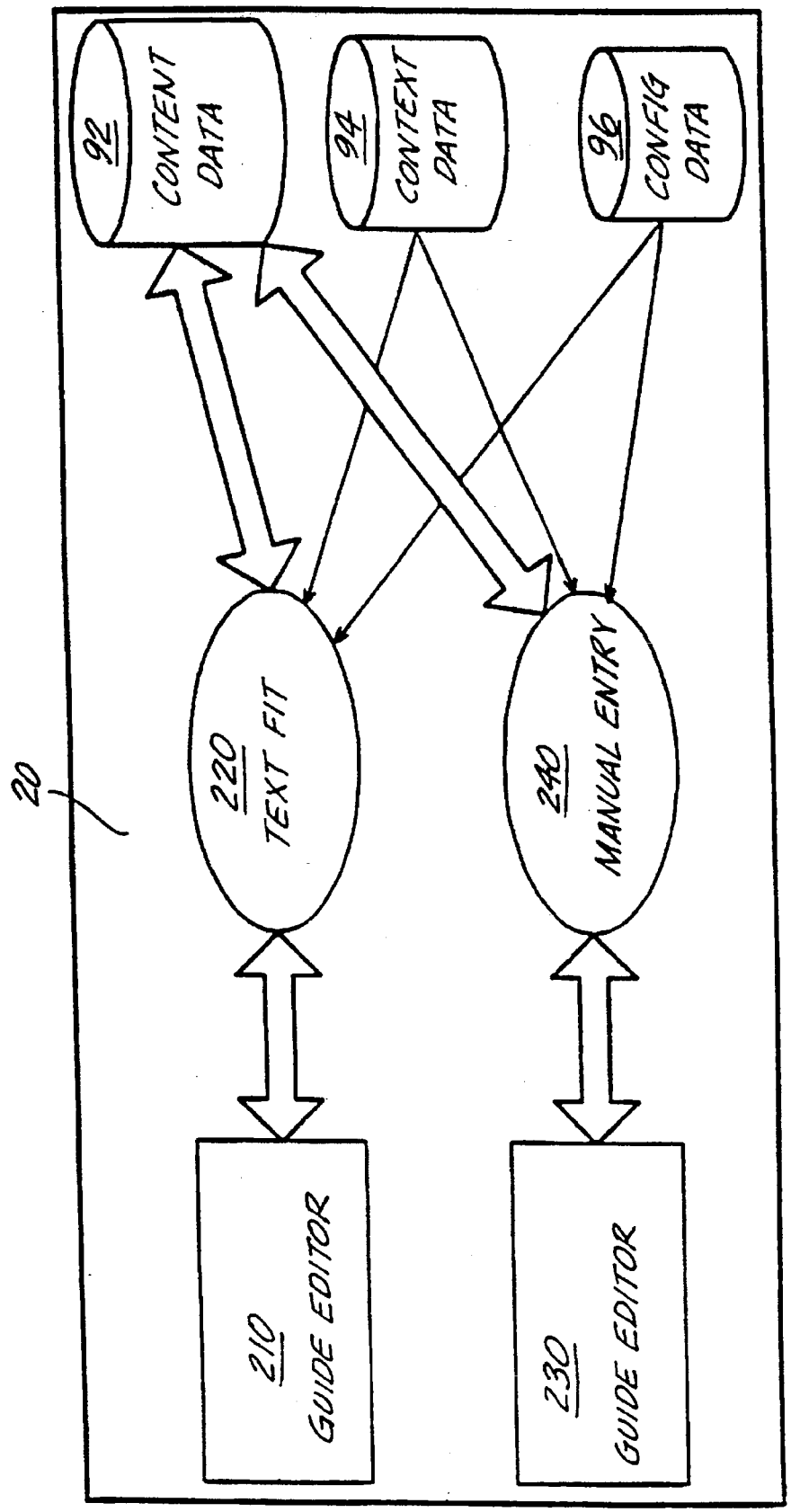
FIG. 4 is a block diagram illustrating one embodiment of the Manual Entry and Corrections subsystem of the present invention.

FIG. 4 illustrates the processes performed by the Manual Entry and Corrections (MEC) subsystem 20. The MEC subsystem is needed because often it is necessary for the EPG distributor to manually make changes, corrections, and deletions to the data contained in the main database 90. One example of the type of manual changes made is referred to as "text fit" discussed in greater detail below. The text fit process is a two stage process including a non-interactive background process that scans the database for work which needs to be done and interactive processes that scan for marked entries that are indexed and easy to find. The interactive portion of text fit provides the editor with the context information to make the appropriate changes. The combined noninteractive/interactive design avoids having multiple interactive processes performing the same validation on pieces of data, and causes a minimum of data to cross the network link in a client-server implementation. Editing of titles and copy is required because the different target devices utilized by the EPG providers serviced by the EPG distributor have different field sizes for the display of the titles and copy. The text fit application determines which titles and copy must be edited for the different hardware so the editor may include abbreviated titles in the database for these titles and copy. The text fit process stores updated data formatting criteria for all possible target platforms and applies these criteria to the text in the database for all the target platforms. If text is located that requires editing, the editor is prompted for the required input to edit the text for the target platform. When edits are made, a library of edited titles and copy is updated for future reference. In this manner, the process may be partially automated by consulting the library prior to prompting the user the next time the same text or copy is found in the database.

As shown in FIG. 4, the editor 210 controls the text fit processor 220 to alter the content of the main EPG database using context and configuration data. Also shown in FIG. 4 is a general manual entry processor 240 by which editor 230 can enter and correct other EPG data. It is important that the EPG data distribution and management system provide this capability because it is frequently necessary to make manual corrections to the data in the main database 90. Some of the information that may be modified by process 240 is station log data (a list of programs for a particular starion), channel maps, premium service information, promotional copy, PPV pricing and scheduling data, subscriber messages, advertising video and text data, and near video-on-demand (NVOD) scheduling and pricing data. The MEC subsystem may alternately be configured to modify any other information requiring modification.

It is preferable that the MEC subsystem comprise a user interface for the display, entry, and modification of data, a reporting mechanism and audit trail for tracking changes made to the data, security to permit only authorized editors to alter the data in the main database 90, and a help facility to assist editors in using the MEC subsystem.

The database validation or verification subsystem 30 is used to review the information contained in the main database 90 for corrections. For example, the database validation subsystem generates a report 35 (FIG. 1) on the database for determining if text fit corrections are necessary. It receives configuration information identifying the feeds and editions which must be supported and verifies that all of the data necessary to create the feeds and editions is present and correct. The database validation subsystem operates automatically on either the entire database or any subset thereof designated by the operator. Subsets may be designated by defining the time window and particular editions to be validated.

The validation subsystem 30 may include a program title size checker to scan for titles that are too large to fit within the field of a target device, a promotional copy size checker for the same purpose, a station log checker to check for schedule holes and overlaps, a database purge to purge out-of-date data from the database, and a general integrity checker to perform a general integrity check on the database. For the program title and promotional copy size checkers, the validation subsystem outputs a control file with sufficient context information to identify each problem in the database requiring correction and reports containing the number of changes required. For the station log and database integrity checkers, the validation subsystem outputs reports detailing the problems found. It will be apparent to those of skill in the art that the validation subsystem may be readily configured to check any additional number of potential problems with the data, including missing titles and copy, inappropriate language, missing price or promotional copy for a PPV event, and missing MPAA rating for unedited movies. A data verification system for an EPG is described in commonly assigned, application Ser. No. 330,684, now U.S. Pat. No. 5,576,755, titled "System and Method for Verification of Electronic Program Guide Data," which is incorporated herein by reference.

Figure 5:
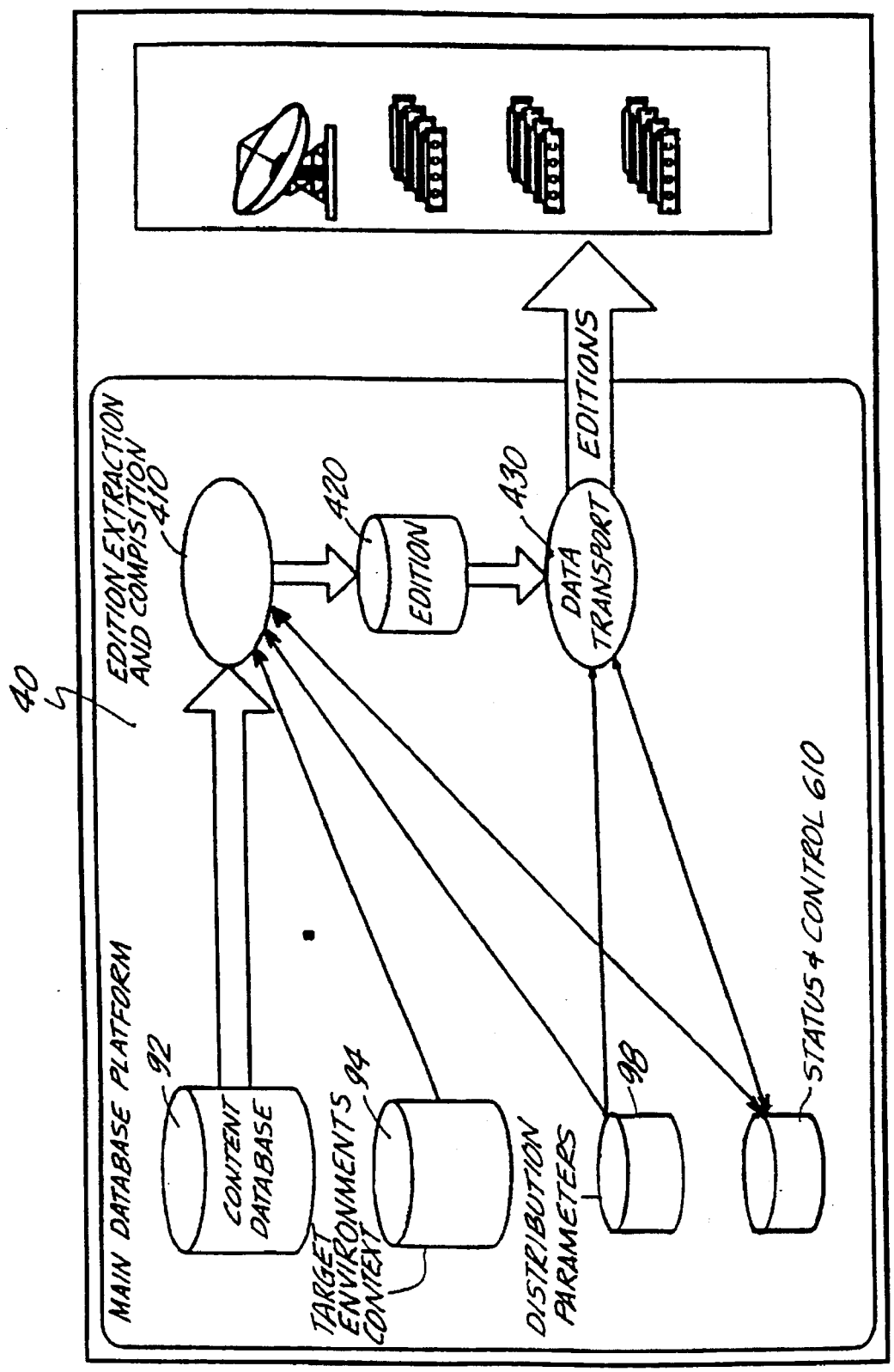
FIG. 5 is a block diagram of one embodiment of the edition generation subsystem of the present invention.

The edition generation subsystem 40 is shown in FIG. 5. Editions may be generated, e.g., on a daily basis or some other periodic basis. The editions that must be generated are determined by the target environments and channel maps of the EPG providers. The edition extraction and composition process 410 reads information from the database 90 and may create a cache of the data from the content database 92 required for the generation of a specific edition. The EPG database 90 includes all the data relevant to the context for a specific edition including headends, channel maps, and time windows for the edition to be generated. Utilizing the target environment context data 94 and data from the distribution parameters in the configuration database 96, an edition 420 is composed and transported to the target device at 430. Edition generation may be either on a periodic or scheduled basis, or as a result of interrupts from the status and control data 610 which is part of the status and control subsystem 60 discussed below.

There are several different types of editions generated by the edition generation subsystem as dictated by the varying reception, processing, and storage capabilities of the target devices serviced by the EPG distributor. The following are representative examples of the various types of editions that may be generated.

Many-Systems Edition

The many-systems edition is a single composite edition of the EPG transmitted to a plurality of EPG providers. Each EPG provider that receives the many-systems edition extracts relevant data from the data comprising the edition, and uses only that data for the type of EPG provided—either the dedicated channel or interactive EPG, or both. The EPG provider identifies itself to the many-systems edition as part of a handshaking protocol. Based on the identification of the EPG provider, the data unique to the EPG provider is extracted from the many-systems edition and furnished to the EPG provider's data processor. This data includes the program schedule information, channel map, and configuration data for the EPG provider.

The many-systems edition is distributed to the EPG providers by, e.g., satellite transmissions. Each EPG provider possesses a reception antennae to receive the digital data stream. Such satellite transmission techniques are well known in the art. Alternatively, microwave transmission, cable, fiber optic, or telephone lines may be used for transmission of the data. Filtering is accomplished by loading the EPG data into the memory of a data processor at the EPG provider. If the EPG provider is not itself a cable headend but a higher level entity such as a cable group, the EPG provider may perform the extraction for each of the cable headends it services so as to furnish customized databases to the headends. The advantage of this method of distribution is that control over the extract process is at the EPG provider, as opposed to the EPG distributor, thus allowing for distributed processing of the final database. This permits better utilization of the broadcast bandwidth by distributing redundant information once to multiple EPG providers.

The disadvantage of the many-systems edition is that it requires substantial processing and memory capabilities at each of the remote locations to which it is transmitted. Many smaller EPG providers may not have computers with these capabilities and thus alternate distribution means are required. In addition, it may be necessary to distribute data to systems with sufficient processing power but with architectures that are already fixed and thus unable to make use of the many-systems edition.

Single-system Edition

An alternate option for EPG providers that do not have the processor and memory capabilities required for the many-systems edition is to provide a customized, single-system edition for these providers. For a single-system edition, the EPG distributor extracts from the EPG database the EPG data for a particular program distributor. As for the many-systems edition, the data is extracted based on the channel map for the EPG provider. Typically, the data is compressed and transmitted via modem over the publicly switched telephone network. This is the most economical means of transmission for smaller EPG providers and will not require an unreasonably long time period for data transmission because only the data for a single EPG provider is transmitted in each communications session. Of course, other transmission means are possible as well.

The advantage of this system is that the program distributor receives an EPG already customized for its distribution system so that little or no processing is required before the EPG is transmitted to viewers. In addition, because only data required by the particular distribution system is transmitted, the memory and processing requirements for the EPG provider are much less than for a many-systems edition.

The particular target environments supported by the data management and distribution system of the present invention are advanced analog settop converters for interactive EPGs, such as the SA-8600X by Scientific-Atlanta that communicates with the SA-ISP Information Services Processor at the headend, the GI CFT2200 converter by General Instrument that communicate with a headend computer called an IPG, or the MM2500, an advanced analog converter by Zenith. Each settop converter has unique transmission protocols and other target-unique parameters that are stored in the configuration database. It will be readily apparent to those of ordinary skill in the art that the system may be utilized with advanced digital settop converters, other data processors, or any number of other target devices, provided the proper target-unique parameters are stored in the configuration database.

The configuration subsystem 50 is used to maintain information in the database related to distribution of the EPG to the various EPG providers. This data includes information such as lists of headends receiving each different edition of the EPG, schedules for creation of the different editions, operational parameters associated with the different target environments, and any other target-defined data needed to generate the different editions and feeds. The configuration data maintained by the configuration subsystem is consulted by the other subsystems while performing their tasks. For example, the configuration data is consulted by the ADC processor in performing the function of collecting data for the database, the text fit processor to determine the field sizes for the different target devices, and the edition and feed generator subsystems for scheduling the creating and transport of editions and feeds.

Figure 6:
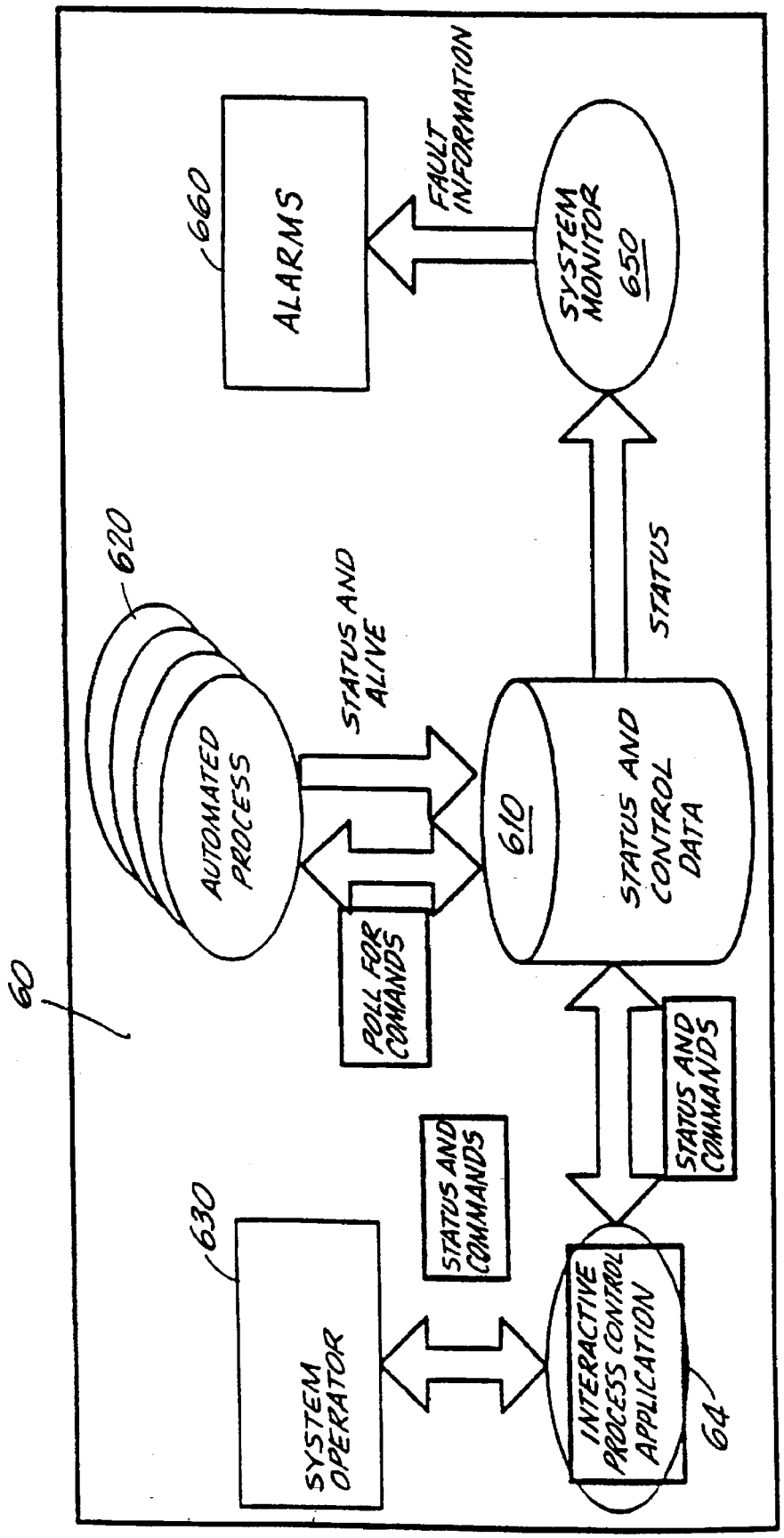
FIG. 6 is a block diagram of one embodiment of the status and control subsystem of the present invention.

Status and Control subsystem 60 is shown schematically in FIG. 6. The status and control subsystem monitors operation of the data management and distribution system as a whole and provides interactive applications for process control. The status and control data 610 contains a common format of how the system should "look" as dictated by control data, and information as to the current status of all the processes. The data is updated periodically by both automated and interactive processes. Automated processes 620 poll the status and control database 610 for commands that have been set by the system operator. Automated processes 620 also provide status data to status and control data 610. The automated processes 620 represent the various processes associated with the other subsystems of the data management and distribution system. A system operator 630 can query and control the operations and state of the system through an interactive process control application 640. Automated system monitor 650 continuously evaluates the status and control data and generates alarms 660 if faults are detected.

The status and control subsystem 60 performs a "watchdog" function by monitoring the status of the various processes that make up the data management and distribution system. Information as to what processes are expected to be executing under different conditions and what state they should be in is held in the configuration database 96. At regular intervals, the status and control subsystem obtains this status information from the database, verifies that the processes exist and are in the correct state, and raises an alarm if any problems are detected.

A common status and control subsystem for the entire data management and distribution system facilitates overall monitoring of the system and provides a logical location for overall system control. In this manner, changes in status in any subsystem may readily be used to trigger monitoring and control events of any other subsystem. In addition, a common status and control subsystem makes the distributed processing architecture of the data management and distribution system transparent to the a system operator.

The status and control subsystem also generates performance reports tracking the operation of the system. The performance reports may contain analyses of system performance generated either on-demand or periodically.

Figure 7:
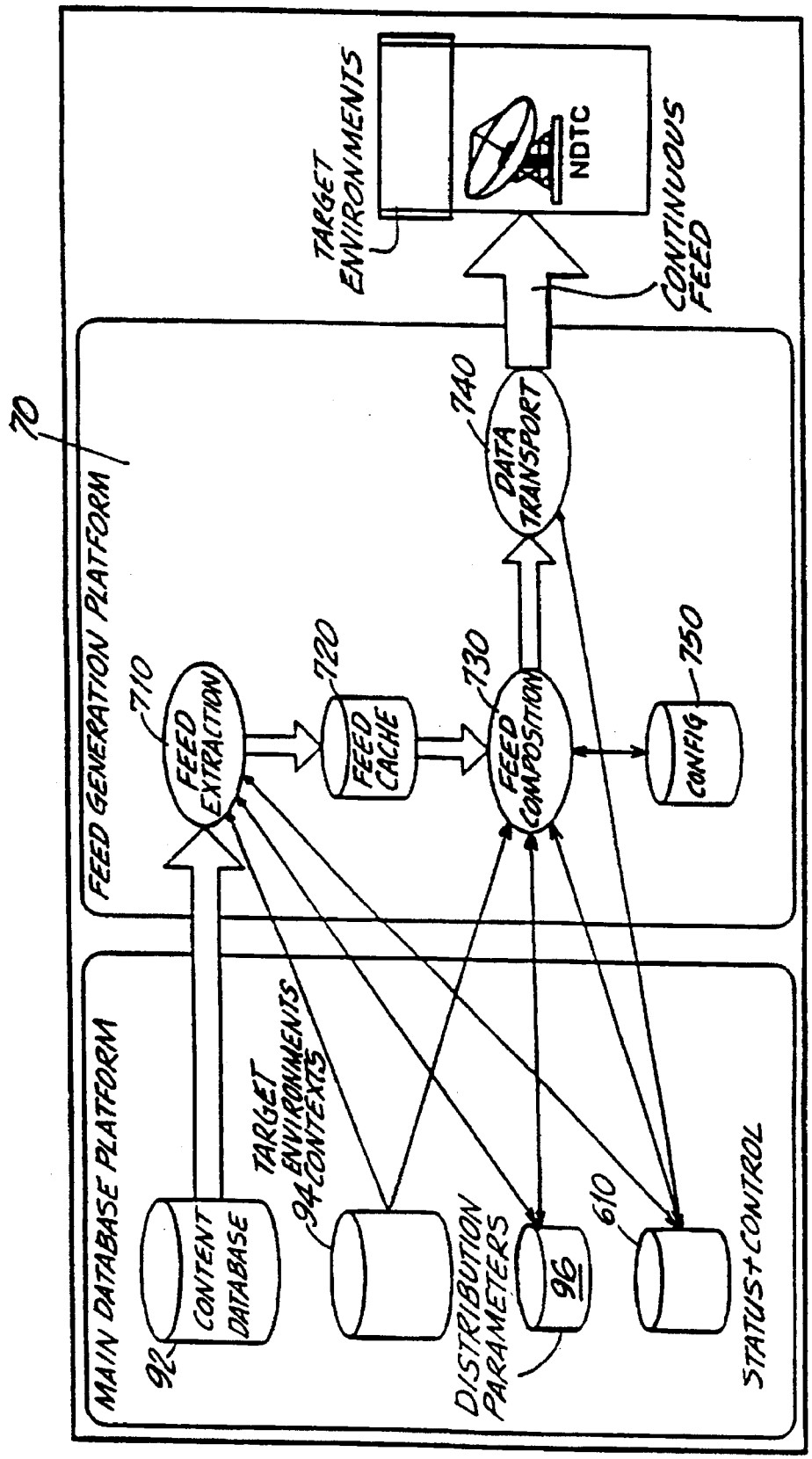
FIG. 7 is a block diagram of one embodiment of the feed generation subsystem of the present invention.

The feed generation subsystem 70 is shown in FIG. 7. The feed generation subsystem 70 generates a continuous stream of data for target environments such as the DigiCable System designed for TCI. The feed repeatedly distributes data in a cyclic fashion to the DCT settop boxes manufactured by General Instrument which store the EPG data in volatile memory so that the database is lost whenever the boxes lose power. Therefore, the settop boxes must be continuously supplied with data so that the memory can be loaded when the boxes are powered on.

The DigiCable feed is a compressed digital video data feed using MPEG 2 format for the video packets. Embedded in the feed is a digital data stream comprising the EPG data and control data broken down into packets identified by packet ids (PIDs). The PIDs are used to identify distinct data streams within the DigiCable feed. In one embodiment, two data streams identified by different PIDs are used. The data rate of the data in the DigiCable feed is much greater than the internal data rate of the settop box so that the settop box can receive and store only a small portion of the incoming data. The first PID is used to identify a short term or start-up data stream comprising the application software, channel descriptions, and nationwide broadcast program schedule data. The purpose of this feed is to permit a demonstration of the box immediately after connecting it to the DigiCable feed. The settop boxes are populated with the short term data so as to permit operation of the box by cable system personnel immediately after hook-up which greatly reduces the installation costs. The second PID identifies long term or "steady state" data such as program schedule information for programs not scheduled for several hours and local program information. This data is captured after the short-term data is already loaded in the settop box.

As illustrated in FIG. 7, on either a periodic, scheduled basis, or as the result of interrupts from the status and control subsystem 60, the feed extraction process 710 connects to the main database 90 and extracts the appropriate content information based on the target environment context and the pertinent distribution parameters for the DigiCable feed. Data extracted from the main database 90 is cached in the feed cache 720 on the feed generation platform. The feed generation process 710 updates the cache 720 only when there is new data in the main database 90. The feed cache is configured so that the data is as optimized as possible for the format required in the feed. The feed composition process 730 consults the rules specified by the description parameters contained in the configuration data and the target environment context data for the DigiCable feed to generate the feed data. The formatted data is then passed to the data transport process 740 for distribution to the National Digital Television Center (NDTC). If the feed generation platform is remotely located from the NDTC, the data transport process 740 may utilize a dedicated leased line with a network bridge. The NDTC uplinks the digital data stream to a satellite for transmission to the target platforms. A local database of configuration data 750 (distribution parameters and context data) is maintained on the feed generation platform due to the fact that connections between the feed generation platform and the main database 90 platform are preferably client-server as opposed to continuous. Configuration data 750 is updated periodically from the main database 90 or when directed by the status and control subsystem. The composition of the feed is partially determined by how frequently the data in the feed is likely to be requested. For example, data for programs scheduled for the present day will be included more frequently in the feed than data for programs airing in a week.

The DigiCable feed requires high availability because it operates 24 hours a day, seven days a week with no down time. It is preferable that the feed generation platform be different from the main database 90 platform and that the connection from the feed extraction and feed composition processes to the main database 90 be client-server. This permits the generation of the continuous data stream for the DigiCable feed to be independent of the processing and database activity on the main database 90 platform and isolates the high availability requirement to the feed generation platform. The use of a separate platform for the feed generator and redundant feed generators with feed caches permits the isolation of the high availability requirement from the remainder of the data management and distribution system.

Figure 8:
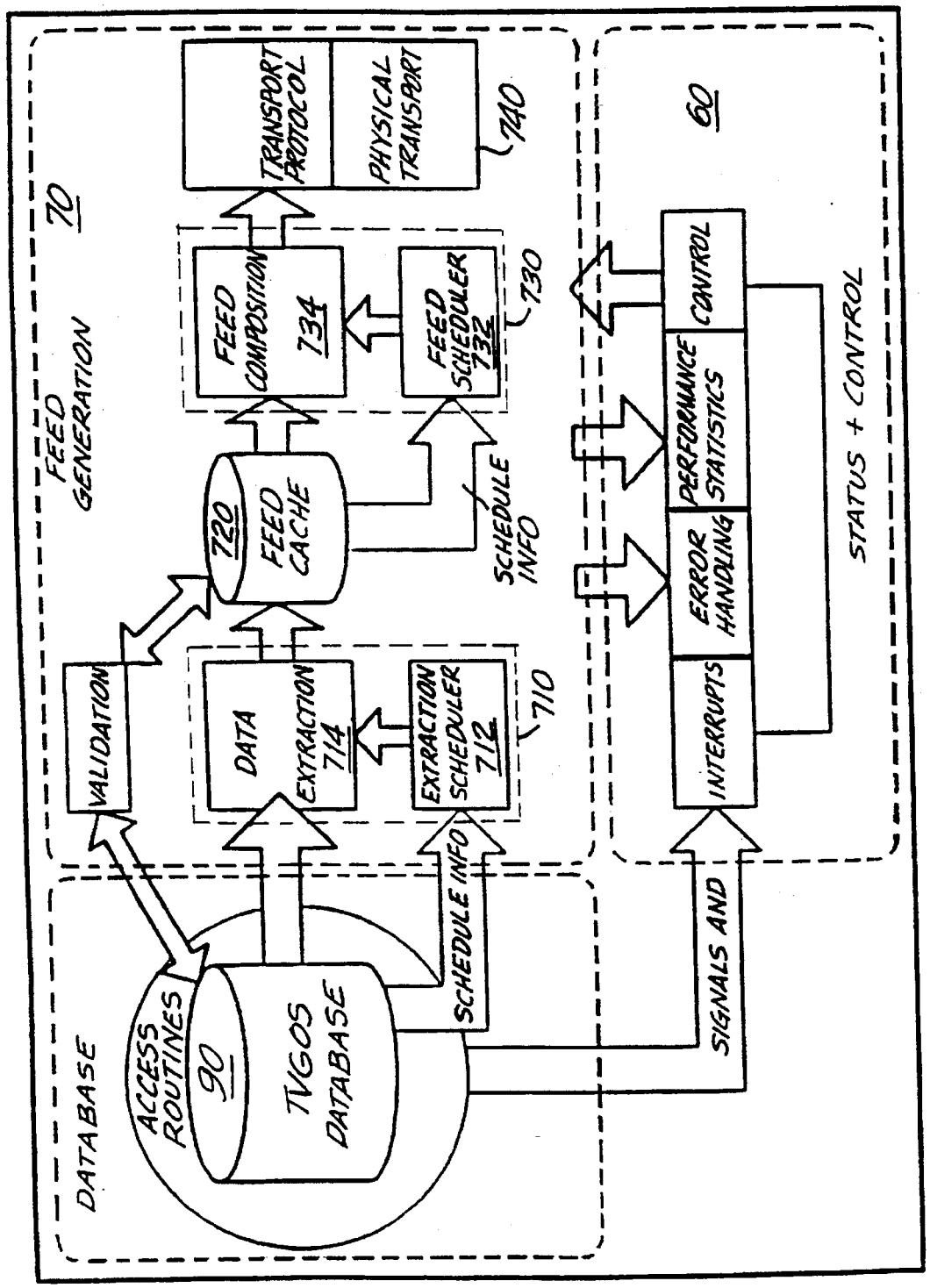
FIG. 8 is a block diagram illustrating the process of generating an EPG data feed.

FIG. 8 is a block diagram illustrating the interaction of the validation, feed generation, and status and control subsystems with the database to generate a data feed which could be used for either an edition or a continuous digital data stream. At some time prior to the creation of a feed or edition, the validation subsystem 30 validates the data required for the feed or edition based on an identification of the feed or edition and specification of the ranges of dates and times to be validated. Generally, all the data in the main database 90 will be validated prior to generation of a feed, but data stored in either the main database 90 or feed cache may be validated so that validation need not be done until after the data extraction process. The feed extraction process 710 is composed of extraction scheduler 712 and the data extraction process itself 714. The extraction scheduler 712 receives context data from the main database 90 to control extraction of data therefrom. The data extraction process 714 reads information from the main database 90 and creates a feed cache 720 of information required for the generation of a specific feed. The feed cache 720 acts as a buffer memory so that upon generation of the feed, the main database 90 need not be accessed. The feed composition process 730 is composed of the feed scheduler 732 and the feed composition itself 734. The feed composition process creates the final feed to be transmitted by the transport process 740, which comprises processing according to the transport protocol for the feed and the actual transport of the feed.

Signals are delivered to the status and control subsystem 60 from the main database 90. The signals are used for notification of database changes that might affect the content of the cache being used for feed generation. The signals may be created through triggers or data access routines. Status and control subsystem 60 monitors the generation of the feed for errors and performance statistics, and controls the feed generation process as required.

Other subsystems may optionally be used with the data management and distribution system of the present invention. One possible additional subsystem is a video management subsystem for handling promotional and other types of videos. The video management subsystem would be used as follows. If a particular feed or edition generated by the system includes, e.g., a PPV movie for which a promotional clip is available, the video management subsystem will provide this clip with the feed so that the EPG providers may run the clip as part of the EPG to promote the movie. The video management subsystem is responsible for handling the receipt, processing, and distribution of these and other videos. In effect, it incorporates the functions of the seven other subsystems for the particular purpose of video distribution.

Another possible subsystem is one used for the distribution of software. Included in the different feeds and editions is the software provided to the target environments required to run the EPGs. A software distribution subsystem may be used to receive, process, and distribute this software to the various EPG providers. The software is provided to the EPG providers based on the target device or devices used by the particular providers. The software distribution subsystem operates similarly to the video management subsystem in that it performs all the necessary functions for the specialized purpose of software distribution.

A third possible additional subsystem is for message management. It is desirable for the EPG distributors and providers to send messages to EPG users at a national, regional, and local level. Messages may be directed to a wide variety of topics, such as upcoming events, news flashes, community bulletin boards, etc. A message management subsystem is required to receive, process, and distribute messages in the same manner as program schedule information. Based on the type of message, national, regional, or local, the message management system includes the messages in the appropriate editions and feeds utilizing the proper configuration data.

System Implementation

The particular hardware platform for implementation of the EPG data management and distribution system is not critical to the invention. It will be apparent to those of ordinary skill in the art that the primary factor driving the choice of hardware is the volume of data that must be processed by the EPG distributor. In a preferred embodiment, due to the expected size of the main database 90, it is preferable that the main EPG database reside on a moderate-sized, RISC-based database server, such as a Hewlett-Packard 7000 series configured with several gigabytes of storage in a disk army with high performance I/O channels. It is preferable that the ADC subsystem also be implemented using such a Hewlett-Packard 7000 series RISC-based workstation optimized for disk throughput because the ADC processor requires a high performance machine optimized for accessing the CDE and performing comparisons with the main database 90. A similar RISC-based machine is preferable for the DigiCable server. Because of the requirement for a continuous feed, it is preferable that the DigiCable feed be implemented with full redundancy. The other edition generators may run on the main database 90 platform. If necessary, they may be moved to separate servers and access the main database 90 platform through a client/server connection. The MEC subsystem may utilize PC-class machines as workstations connected to the main database 90 machine via a client/server network connection. The status and control and configuration subsystems may be resident on the same computer as the main database 90 platform. The particular hardware requirements will be readily apparent to those skilled in the art of client/server database systems and they will recognize that many other hardware configurations are possible without departing from the spirit and true scope of the invention.

With regard to operating systems, it is preferable that UNIX be run on the main database 90 platform and the Digitable feed generators. Other feed generators implemented on separate hardware systems should also run UNIX. UNIX is also preferable for the ADC processor for consistency, but Windows™ NT or IBM OS/2 also may be used. The MEC subsystem may use MS Windows as there is no clear benefit to running Windows NT or OS/2 for the MEC subsystem. For the database itself, a commercial relational database may be utilized, such as Oracle or Sybase. It will also be appreciated by those skilled in the art that there can be departure from the specific embodiment of the invention described herein without departing from the true scope of the claims appended hereto.

We claim:

1. A process for the management and distribution of data for an electronic television program schedule guide wherein program schedule information is distributed to a plurality of target devices, said process comprising:

receiving television program schedule data from one or more sources and using said received data to update a database of television program schedule data;

manually accessing said database and making changes and corrections thereto;

validating a portion of the data in said database;

extracting a portion of said validated data in said database and generating a data set in accordance with configuration data for one or more of said target devices;

maintaining said configuration data in said database; and monitoring and controlling the operation of one or more of said receiving process, accessing process, validation process, extracting process, and configuration maintenance process.

2. The process of claim 1 wherein said receiving step comprises receiving program schedule data on a time-selected basis, determining the differences between said received data and program schedule data received at a time prior to said received data, and updating said database in response to said determination.

3. The process of claim 2 wherein said received television program schedule information is converted to a format optimized to determine the differences between said received television program schedule information and television program schedule information received at a time prior to said received television program schedule information.

4. The process of claim 1 further comprising extracting a second portion of said validated data in said database and generating a continuous stream of data in accordance with configuration data for one of said target devices.

5. The process of claim 4 wherein said feed generating step comprises transporting said continuous data stream to a satellite transmission system for distribution to said EPG providers.

6. The process of claim 5 wherein said transport means comprises means for transmitting said database via satellite.

7. The process of claim 4 wherein said feed generating step comprises temporarily storing said second extracted portion of data in a feed cache prior to generating said continuous stream of data.

8. The process of claim 1 wherein said edition generating step generates a data set for a single EPG provider.

9. The process of claim 1 wherein said edition generating step generates a composite data set for a plurality of EPG providers.

10. The process of claim 1 further comprising the steps of receiving channel map data and updating said database in response to said received channel map data.

11. The process of claim 10 wherein said channel map data receiving step comprises receiving channel map data on a time-selected basis, and further comprising determining the differences between said received channel map data and channel map data received at a time prior to said received channel map data, and updating said database in response to said determination.

12. The process of claim 1 further comprising transporting said data set to said EPG providers.

13. The process of claim 12 wherein said transporting step comprises transmitting said database via satellite.

14. The process of claim 12 wherein said transporting step comprises transmitting said database over telephone lines.

15. The process of claim 1 wherein each of said receiving process, accessing process, validation process, extracting process, and configuration maintenance process are monitored and controlled by a common status and control subsystem.

16. A data management and distribution system for an electronic television program schedule guide (EPG) wherein program schedule information is distributed to a plurality of EPG providers for use with a plurality of target devices, said system comprising:

automated data collection means for receiving television program schedule data from one or more sources and using said received data to update a database of television program schedule data;

manual entry and correction means for accessing said database and making changes thereto;

database validation means for validating a portion of the data in said database;

edition generating means for extracting a portion of the data in said database in accordance with configuration data for one of said target devices and generating a data set, said data set comprising an edition of said EPG for one or more of said EPG providers;

configuration maintenance means for maintaining said configuration data in said database; and status and control means for monitoring and/or controlling the operation of one or more of said automated data collection means, manual entry and correction means, database validation means, edition generating means, and configuration maintenance means.

17. The system of claim 16 wherein said automated data collection means receives said television program schedule information on a time-selected basis and determines the differences between said received program schedule information and program schedule information received at a time prior to said received program schedule information, and updates said database in response to said determination.

18. The system of claim 17 wherein said received television program schedule information is converted to a format optimized to determine the differences between said received television program schedule information and television program schedule information received at a time prior to said received television program schedule information.

19. The system of claim 16 further comprising feed generating means for extracting a second potion of the data in said database and generating a continuous stream of data in accordance with configuration data for one of said target devices.

20. The system of claim 19 wherein said feed generating means comprises transport means for transporting said continuous data stream to a satellite transmission system for distribution to said EPG providers.

21. The system of claim 19 wherein said feed generating means comprises a feed cache for temporarily storing said second extracted portion of data prior to generating said continuous stream of data.

22. The system of claim 19 wherein said feed generating means is isolated from said automated data collection means, said manual entry and correction means, said database validation means, said edition generating means, said configuration maintenance means, and said status and control means.

23. The system of claim 16 wherein said edition generating means generates a data set for a single EPG provider.

24. The system of claim 16 wherein said edition generating means generates a composite data set for a plurality of EPG providers.

25. The system of claim 16 wherein said automated data collection means further comprises means for receiving channel map data, said automated data collection means updating said database in response to said received channel map data.

26. The system of claim 25 wherein said automated data collection means receives said channel map data on a time-selected basis and determines the differences between said received channel map data and channel map data received at a time prior to said received channel map data, and updates said database in response to said determination.

27. The system of claim 16 wherein said edition generating means comprises data transport means for transporting said data set to said EPG providers.

28. The system of claim 27 wherein said transport means comprises means for transmitting said data set via satellite.

29. The system of claim 27 wherein said transport means comprises means for transmitting said data set over telephone lines.

30. The system of claim 16 further comprising security means for restricting access to said database.

31. The system of claim 16 wherein said status and control means monitors and controls the operation of each of said automated data collection means, manual entry and correction means, database validation means, edition generating means, and configuration maintenance means.

32. An automated data collection system for an electronic television program schedule guide (EPG) wherein program schedule information is distributed to a plurality of EPG providers for use with a plurality of target devices, said system comprising:

means for receiving television program schedule data from one or more sources on a time-selected basis, said received program schedule data comprising program titles for a plurality of television programs and channel maps for a plurality of EPG providers;

means for reformatting the received data to a form optimized for determining the differences between said received data and program schedule data received at a time prior to said received data;

means for determining the differences between said received data and program schedule data received at a time prior to said received data;

means for updating a database of program schedule information in response to said determination.

33. A feed generator for an electronic television program schedule guide (EPG) wherein program schedule information is distributed to a plurality of EPG providers for use with a plurality of target devices, said feed generator comprising:

data extraction means for extracting television program schedule data from a database in accordance with configuration data for one of said target devices;

extraction scheduler means for controlling the timing of said extraction of data in accordance with schedule information in said database;

a feed cache for temporarily storing said extracted data;

feed composition means for composing a digital data stream using the data in said feed cache;

feed composition scheduler means for controlling the timing of said composition of said digital data stream in accordance with schedule information in said feed cache;

transport means for transporting said digital data stream to a satellite transmission system for distribution to said EPG providers.

34. The system of claim 16 further comprising a video management subsystem for receiving videos and providing said videos to said edition generating means for inclusion in said data set.

35. The system of claim 34 wherein said videos comprise promotional videos and said video management subsystem provides said promotional videos to said edition generating means based on the content of said data set.

36. The system of claim 16 further comprising a software distribution subsystem for receiving software for said target devices and providing said software to said edition generating means for inclusion in said data set.

37. The system of claim 16 further comprising a message management subsystem for receiving at least one of national, regional, and local messages, and providing said messages to said edition generating means for inclusion in said data set.

* * * * *